United States Patent
Shaffer et al.

(10) Patent No.: US 6,853,716 B1
(45) Date of Patent: Feb. 8, 2005

(54) SYSTEM AND METHOD FOR IDENTIFYING A PARTICIPANT DURING A CONFERENCE CALL

(75) Inventors: Shmuel Shaffer, Palo Alto, CA (US); Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 09/836,055

(22) Filed: Apr. 16, 2001

(51) Int. Cl.$^7$ .................. G10L 17/00; H04L 12/18; H04M 3/56

(52) U.S. Cl. .............. 379/202.01; 370/260; 379/88.01; 379/201.02; 704/246

(58) Field of Search .................. 370/259, 260, 370/261, 262, 263, 264, 265, 266, 267, 268, 269, 270, 352, 493, 494, 495; 379/88.01, 201.02, 202.01, 203.01, 204.01, 205.01, 206.01, 900; 704/246, 247; 709/204

(56) References Cited

U.S. PATENT DOCUMENTS

| | | | | |
|---|---|---|---|---|
| 4,947,436 A | * | 8/1990 | Greaves et al. | 704/246 |
| 5,483,588 A | * | 1/1996 | Eaton et al. | 379/202.01 |
| 5,559,875 A | * | 9/1996 | Bieselin et al. | 379/202.01 |
| 5,710,591 A | * | 1/1998 | Bruno et al. | 348/14.09 |
| 6,011,851 A | | 1/2000 | Connor et al. | 381/17 |
| 6,192,395 B1 | * | 2/2001 | Lerner et al. | 709/204 |

* cited by examiner

*Primary Examiner*—Harry S. Hong
(74) *Attorney, Agent, or Firm*—Baker Botts L.L.P.

(57) ABSTRACT

A system and method for identifying a participant during a conference call include the capability to receive a packet containing data that represents audible sounds spoken by one of a plurality of participants in a conference call and to determine a speaker of the audible sounds using voice profile information of the participants. The system and method further include the capability to provide identification information of the speaker to the other participants in the conference call contemporaneously with providing audible sounds based on the data to those participants.

125 Claims, 4 Drawing Sheets

| NAME | TITLE | ORGANIZATION | CURRENT PARTICIPANT | PARTICIPANT ADDRESSES | VOICE PROFILE INFORMATION |
|---|---|---|---|---|---|
| John A. Smith | VP | QPS, Inc. | Y | XXXX | XXXXXXXXX |
| Janice B. Ho | CEO | Coma, Ltd. | N | XXXX | XXXXXXXXX |
| James Q. Davis | CFO | Johnson Bros. | Y | XXXX | XXXXXXXXX |
| Scott Z. Thomas | Chairman | XYZ | Y | XXXX | XXXXXXXXX |
| ⋮ | ⋮ | ⋮ | ⋮ | ⋮ | ⋮ |

*FIG. 3*
| NAME | TITLE | ORGANIZATION | CURRENT PARTICIPANT | PARTICIPANT ADDRESSES | VOICE PROFILE INFORMATION |
|---|---|---|---|---|---|
| John A. Smith | VP | QPS, Inc. | Y | XXXX | XXXXXXXXX |
| Janice B. Ho | CEO | Coma, Ltd. | N | XXXX | XXXXXXXXX |
| James Q. Davis | CFO | Johnson Bros. | Y | XXXX | XXXXXXXXX |
| Scott Z. Thomas | Chairman | XYZ | Y | XXXX | XXXXXXXXX |
| ⋮ | ⋮ | ⋮ | ⋮ | ⋮ | ⋮ |
101 — IDENTIFICATION INFORMATION
100
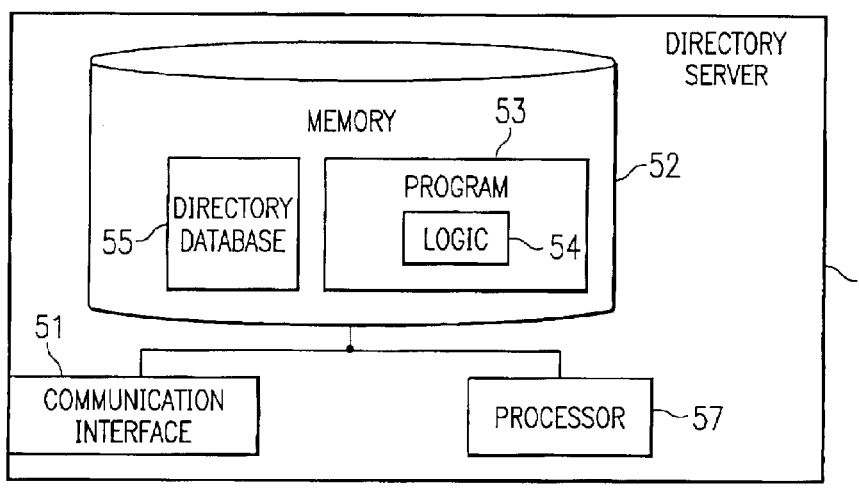
*FIG. 4*
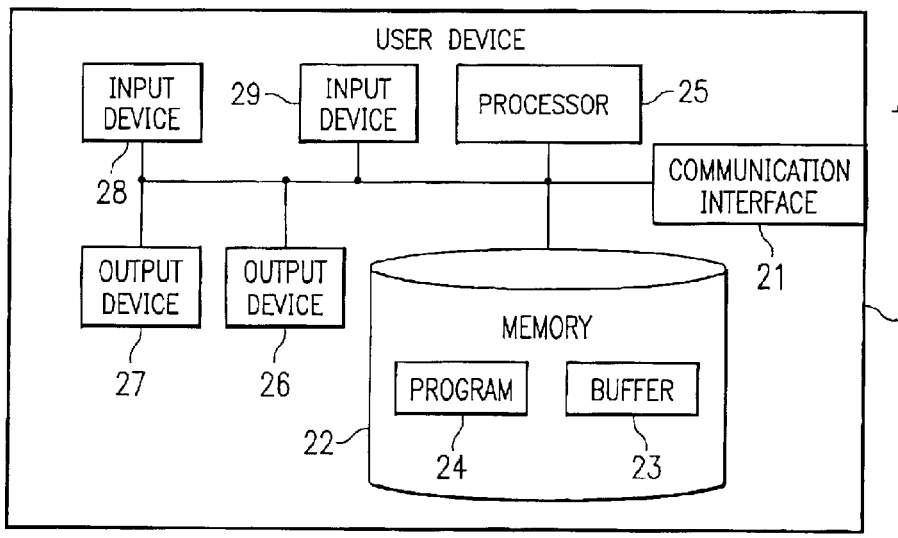
*FIG. 5*

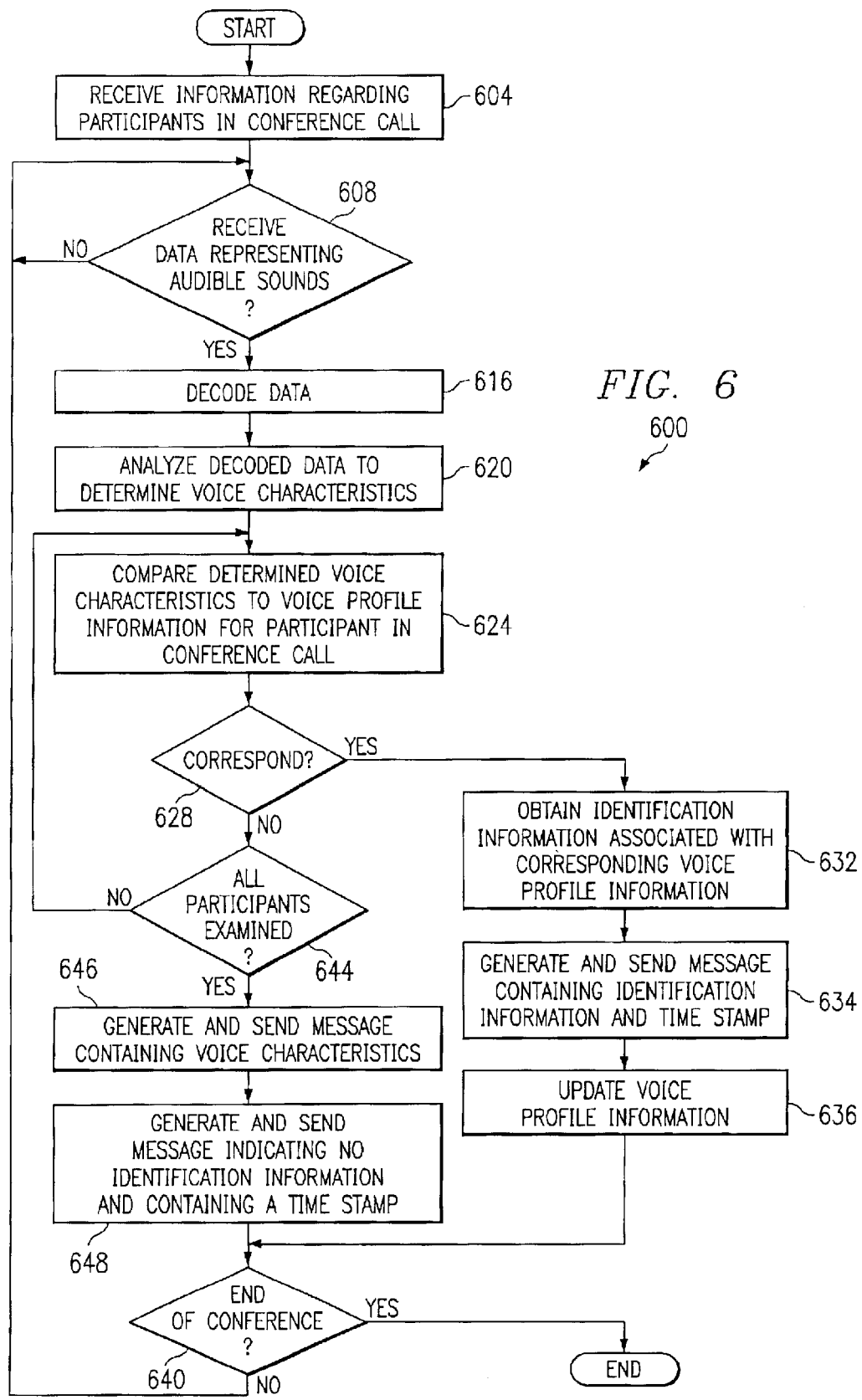

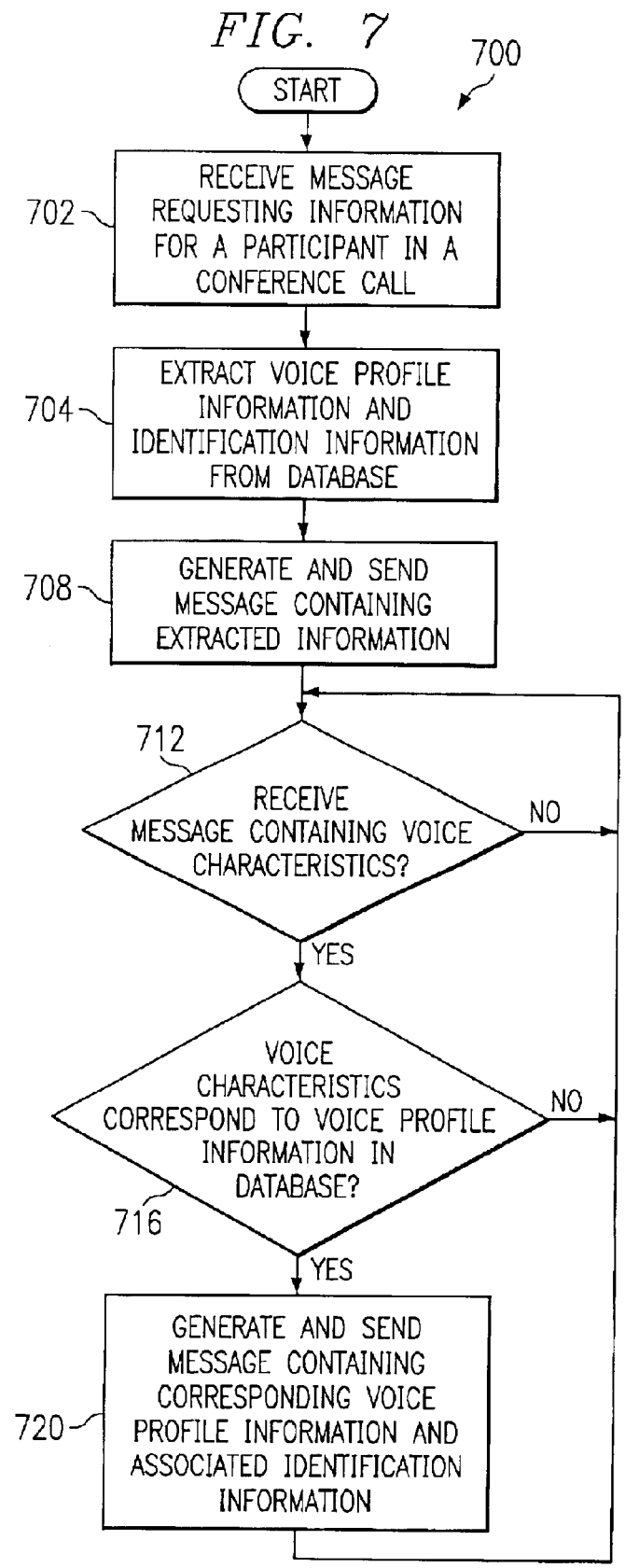

US 6,853,716 B1

SYSTEM AND METHOD FOR IDENTIFYING A PARTICIPANT DURING A CONFERENCE CALL

TECHNICAL FIELD OF THE INVENTION

This invention relates generally to communication networks and, more specifically, to a system and method for facilitating conference calls in communication networks.

BACKGROUND OF THE INVENTION

Communication networks, such as the Public Switched Telephone Network (PSTN), for transporting electrical representations of audible sounds from one location to another are well known. Additionally, packet switched networks, such as the Internet, are able to perform a similar function by transporting packets containing data that represents audible sounds from one location to another, the audible sounds being encoded into digital data and placed into packets at the origination point and the digital data being extracted form the packets and decoded into audible sounds at the destination point.

These communication networks are also able to allow multiple people to participate in a single call, typically known as a "conference call." In a conference call, the audible sounds at each device, usually telephones, are distributed to all of the other devices participating in the conference call. Thus, each participant in the conference call may share information with all of the other participants.

Unfortunately, during a conference call, it may be difficult for a participant to determine who is speaking unless she is familiar with the voices of the other participants. One attempt to combat this problem is to associate identification information for a participant with a particular device, such as the telephone at the person's desk. However, if someone else uses that person's device for a conference call, this information is not only of limited use, but sometimes misleading. Additionally, if multiple people use one device, such as a speaker phone, the associated information is again of limited use. Furthermore, even if the participant is familiar with the voices of the other participants, it may still be difficult to distinguish between them.

SUMMARY OF THE INVENTION

The present invention substantially reduces or eliminates at least some of the disadvantages and problems associated with previously developed systems and methods for identifying participants during a conference call. Accordingly, the present invention provides a system and method that use voice processing to identify a speaker during a conference call and that send identification information for the identified speaker along with the data that represents the audible sounds of the speaker to the other participants in the conference call.

In certain embodiments, a method for identifying a participant during a conference call includes receiving a packet containing data that represents audible sounds spoken by one of a plurality of participants in a conference call and determining a speaker of the audible sounds using voice profile information of the participants. The method also includes providing identification information of the speaker to the other participants in the conference call contemporaneously with providing audible sounds based on the data to those participants.

In particular embodiments, an apparatus for identifying a participant during a conference call includes a communication interface, a memory, and a processor. The communication interface is adapted to be coupled to a communication network and is operable to receive information from and send information to the communication network and to receive a packet containing that data represents audible sounds. The memory is coupled to the communication interface and is operable to store a program containing logic and to store a database containing voice profile information and identification information for at least some of the participants in a conference call. The processor is also coupled to the memory and is operable to determine whether the audible sounds represented by the data are associated with the voice profile information of one of the participants and to generate a message including identification information associated with the identified voice profile information if the audible sounds are associated with the voice profile information of one of the participants.

In some embodiments, an apparatus for identifying a participant during a conference call includes a communication interface, a memory, and a processor. The communication interface is adapted to be coupled to a communication network and is operable to receive information from and send information to the communication network and to receive a message containing data that represents voice characteristics. The memory is coupled to the communication interface and is operable to store identification information and voice profile information for at least some of the participants in a conference call. The processor is coupled to the memory and is operable to detect the reception of the message, to determine whether the voice characteristics correspond to any of the voice profile information, and to generate a message containing the corresponding voice profile information and associated identification information if the voice characteristics correspond to any of the voice profile information.

The present invention has several technical features and advantages. For example, in particular embodiments, the invention associates audible sounds of speakers in a conference call with identification information of the participants in the conference call. Thus, these embodiments of the invention allow the other participants in the conference call to know who is speaking if they are unfamiliar with the voices of the other participants. As another example, in certain embodiments, the invention provides detailed information, such as title and organization, of the identified participant to the other participants in the conference call. Thus, in these embodiments, the invention allows the other participants to have detailed information about the speaker. As an additional example, in some embodiments, the present invention allows a participant to alter the characteristics of the audible sounds of the other participants, such as the direction of arrival or volume, based on the identity of the speaker. Thus, these embodiments provide another manner in which a participant may distinguish between speakers in a conference call. As a further example, the voice profile information of a participant in the conference call may be updated during the call. Thus, as the call progresses, or in future conference calls, the voice profile information for that speaker will be more accurate. Other embodiments may possess none, one, some, or all of these technical features and advantages and/or additional technical features and advantages.

Other technical features and advantages will be readily apparent to one of skill in the art from the following figures, description, and claims.

BRIEF DESCRIPTION OF THE DRAWINGS

To provide a more complete understanding of the present invention, especially when considered in light of the following written description, and to further illuminate its technical features and advantages, reference is now made to the following drawings, in which:

FIG. 3 illustrates one embodiment of the data structure of a database in the conference bridge of FIG. 2 for a conference call;

FIG. 4 illustrates one embodiment of an identification server for the communication system of FIG. 1;

FIG. 5 illustrates one embodiment of a user device for the communication system of FIG. 1;

FIG. 6 is a flowchart illustrating a method for identifying a participant during a conference call in accordance with one embodiment of the present invention; and FIG. 7 is a flowchart illustrating a method for identifying a participant during a conference call in accordance with one embodiment of the present invention.

DETAILED DESCRIPTION OF THE INVENTION

Figure 1:
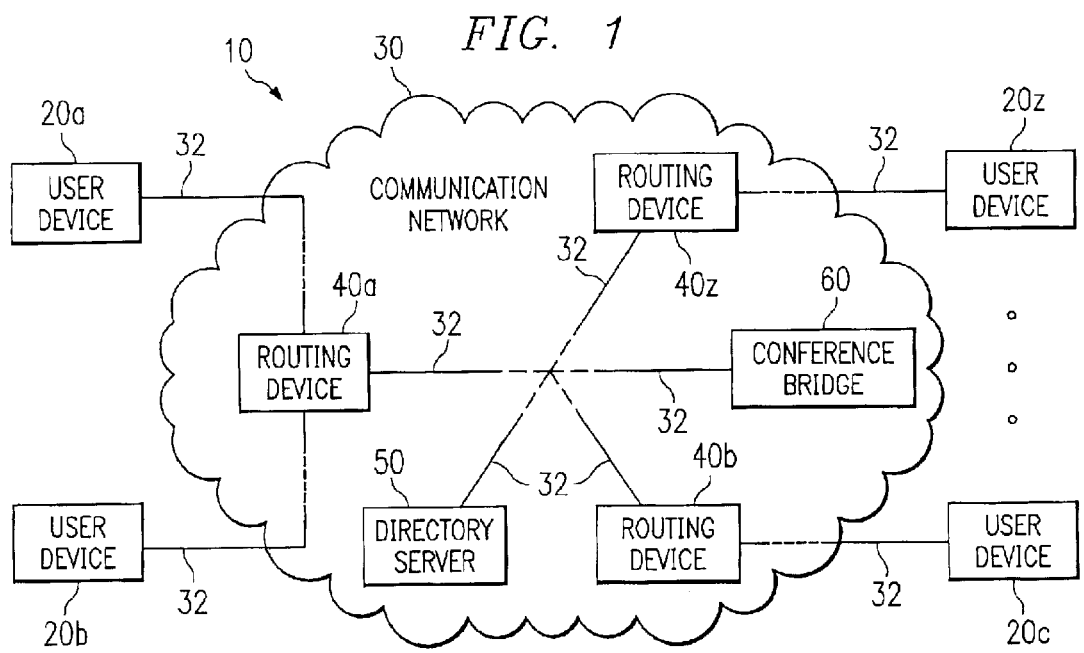
FIG. 1 illustrates one embodiment of a communication system in accordance with the present invention.

FIG. 1 illustrates one embodiment of a communication system 10 in accordance with the present invention. Communication system 10 includes a plurality of user devices 20a–z and a communication network 30. User devices 20a–z are coupled to communication network 30 by communication links 32. In general, communication network 30 allows user devices 20a–z to exchange information with each other by using packets, each packet containing part of the information. To accomplish this, communication network 30 includes a plurality of routing devices 40a–z that facilitate the movement of the packets through communication network 30. Communication network 30 also includes a directory server 50 and a conference bridge 60. Directory server 50 stores identification information and voice profile information for potential participants in conference calls, and conference bridge 60 bridges and controls conference calls, using any appropriate type of protocol, such as, for example, real-time transport protocol (RTP). Moreover, conference bridge 60 may identify participants in conference calls and send identification information to the participating user devices 20a–z. Routing devices 40a–z, directory server 50, and conference bridge 60 are coupled to each other by communication links 32 and any of a variety of other network components.

In operation, during a conference call, user devices 20a–z participating in a conference call send packets containing data representing the audible sounds emitted by their respective users to communication network 30, which routes the packets to conference bridge 60. Conference bridge 60 mixes the data received from each of the participating user devices 20a–z and distributes the data to the participating user devices 20a–z. For example, when user devices 20a–c are participating in a conference call and the participant at user device 20a speaks, user device 20a converts the speech into data that represents the audible sounds, places the data into packets, and sends the packets to communication network 30, through one of communication links 32. Audible sounds may be represented by data by using any of a variety of well known encoding schemes, such as, for example, G.711, G.723, G.729, or MP3. Upon receiving each packet, routing device 40a routes the packet to conference bridge 60. When a packet arrives at conference bridge 60, conference bridge 60 mixes the data representing the audible sounds and forwards it to the other user devices, user devices 20b–c in this instance. User devices 20b–c could then generate appropriate output for their respective users based on the data in the packet.

In another mode of operation, conference bridge 60 determines the identity of the speaker based on the audible sounds represented by the data. To accomplish this, conference bridge 60 identifies the participant using one of user devices 20a–z by analyzing the data representing the audible sounds uttered by the participant and comparing it to pre-stored voice profile information for the participants and/or possible participants in the conference call. In the illustrated embodiment, conference bridge 60 receives the identification information and voice profile information from directory server 50. Conference bridge 60 then conveys identification information associated with the corresponding voice profile information to the other participating user devices 20a–z along with the data representing the audible sounds, and those user devices may then output the identification information along with the audible sounds represented by the data to their respective users. Note that the identification information may consist of the actual identification information or, if the identification information has previously been sent to the participating user devices 20a–z, an indicator for the identification information.

The ability to associate identification information with data representing audible sounds is particularly useful when there are several conference call participants using a single one of user devices 20a–z, because any identification information associated only with the user device is of limited use in this instance. Furthermore, this ability allows participants to effectively implement systems and methods that specify characteristics of audible sounds from certain participants, such as arrival direction and/or volume. This ability is also useful when a participant usually associated with one of user devices 20a–z is using another one of the user devices, because, again, identification information associated only with the user device being used is of limited value.

The components of communication system 10 may have a variety of forms. For example, user devices 20a–z may be soft phones, personal computers, personal digital assistants, intelligent cellular telephones, or any other type of device that can receive data representing audible sounds and identification information and generate output intelligible to a user of the device based on the data and the identification information. As another example, communication network 30 may be a frame relay network, an X.25 network, an asynchronous transport mode (ATM) network, the Internet, or any other type of packet switched network. Routing devices 40a–z of communication network 30 may be routers, switches, bridges, brouters, or any other type of device that can receive data, determine a route for the data, and send the data along the route. Communication links 32 may be wireline links, wireless links, fiber-optic links, proprietary communication links, public communication links, buses, and/or any other appropriate medium for conveying information from one point to another. Additionally, communication network 30 may be composed of any number of routers, switches, bridges, communication links, and/or other devices for transferring information from one point to another point. As an additional example, directory server 50 may be a server, a personal computer, or any other type of device that can store and retrieve information. As a further example, conference bridge 60 may be a separate server, router, personal computer, or physically housed in a server, a router, a personal computer, or any other type of device that can receive data representing audible sounds and determine which of user devices 20a–z to distribute a copy of the data to.

Additionally, communication system 10 may have a variety of configurations. For example, there may be a plurality of routing components between user device 20a and routing device 40a. Furthermore, directory server 50 may be directly connected to conference bridge 60. Moreover, in particular embodiments, directory server 50 may be part of conference bridge 60. A variety of other configurations will be readily suggested to those skilled in the art.

Figure 2:
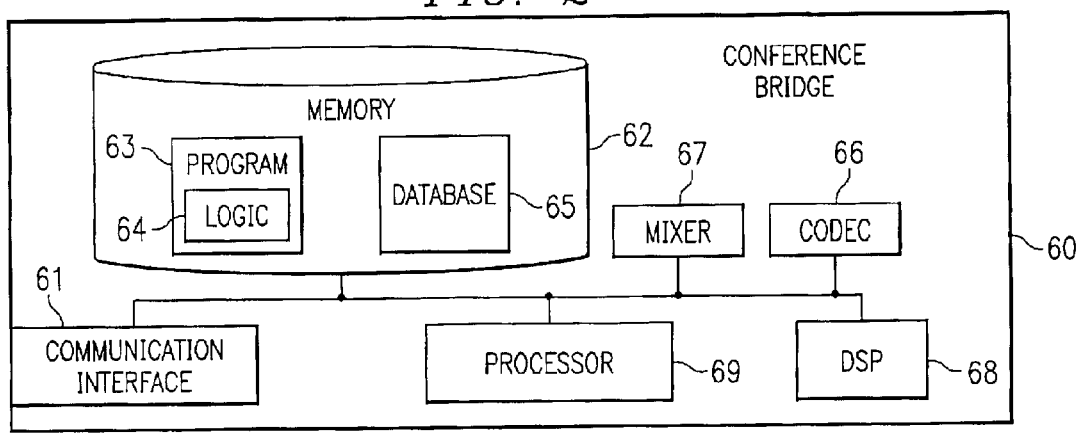
FIG. 2 illustrates one embodiment of a conference bridge for the communication system of FIG. 1.

FIG. 2 illustrates one embodiment of conference bridge 60 for communication system 10. In the illustrated embodiment, conference bridge 60 includes a communication interface 61, a memory 62, a codec 66, a mixer 67, a digital signal processor (DSP) 68, and a processor 69. Communication interface 61 is adapted to couple to one of communication links 32 of communication network 30 and is operable to send information to and receive information from communication network 30. Memory 62 is coupled to communication interface 61 and includes a program 63 and a database 65. Program 63 contains a set of logic 64 for processor 69, and database 65 stores voice profile information and identification information for at least some of the participants in a conference call. Codec 66 is coupled to memory 62 and is operable to decode data representing audible sounds into a format usable by the other components of conference bridge 60. Mixer 67 is also coupled to memory 62 and is operable to combine audible sounds from multiple user device 20a–z for delivery to the participating user devices. DSP 68 is also coupled to memory 62 and is operable to extract voice characteristics from the decoded data, using, for example, speaker recognition technology. Processor 69 is also coupled to memory 62 and is operable to associate the extracted voice characteristics with voice profile information in database 65 and to distribute copies of the combined audible sounds to participating user devices along with any identification information associated with the corresponding voice profile information.

In operation, communication interface 61 receives data representing audible sounds from communication network 30, and the data is stored in memory 62. Processor 69, under the direction of program 63, periodically or continuously checks to determine whether any such data has been received. Once processor 69 determines that such data is present, codec 66 decodes the data. After decoding, the data is sent to mixer 67 and DSP 68. While mixer 67 combines the decoded data with any data received from other participants in the conference call, DSP 68 extracts voice characteristics from the decoded data, and processor 69 finds a correspondence between these and the voice profile information in database 65. Processor 69 then generates a message containing at least part of the identification information associated with the corresponding voice profile information and sends the data representing the mixed audible sounds along with the message to the appropriate user devices. The identification information may consist of the actual identification information, an indicator of the identification information, if the identification information has already been sent to the user devices 20a–z, or any other appropriate data useful for conveying identification information.

Sometimes, however, processor 69 may not be able to find an appropriate correspondence between the extracted voice characteristics and the voice profile information. In such a case, processor 69 may generate a message containing the extracted voice characteristics for directory server 50, which attempts to find a correspondence between the voice characteristics and the voice profile information that it contains and send the voice profile information and associated identification information to conference bridge 60 if an appropriate correspondence is found. Processor 69 may send the identification information from the directory server 50 if it is received before the data is ready to be sent. If, however, no identification information is received from directory server 50 before the data representing the audible sounds is ready to be sent, processor 69 may generate a message indicating that no identification information is associated with the audible sounds, to be sent along with the copies of the data. Processor 69 may update database 65 upon receiving the information from directory server 50. In particular embodiments, a participant or administrator may enter the identity of the unrecognized speaker, and conference bridge 60 may request the appropriate voice profile information and identification information from directory server 50.

Conference bridge 60 may also operate in a variety of other manners. For example, in certain embodiments, conference bridge 60 may generate an identifier, such as, for example, a time stamp, for the message containing the identification information. This identifier may be used by user devices 20a–z to associate the message with the appropriate data representing the audible sounds, which also contains an identifier. As another example, in certain embodiments, processor 69 may update the voice profile information in database 65 as the conference call progresses. Thus, the accuracy with which an identification may be made may be increased during the conference call and for future conference calls. A variety of other operations will be readily suggested to those skilled in the art.

In certain embodiments, conference bridge 60 may decrease processing time and increase accuracy by associating conference call participant(s) with a particular origination address. For example, assume that three participants are using user device 20c. Thus, if conference bridge 60 knows which participants are using user device 20c, it will first examine the information for those participants in database 65 for data representing audible sounds received from user device 20c. Furthermore, conference bridge 60 may use the best match of these participants even if a sufficient level of correspondence is not found The participants at a particular one of user devices 20a–z may be specified before the conference call begins and/or determined by conference bridge 60 as each participant is added to the conference call.

The components of conference bridge 60 may have a variety of forms. For example, communication interface 61 may be a network interface card, a modem, a transceiver, or any other type of device for exchanging information with communication network 30. As another example, memory 62 may be random access memory (RAM), compact disk read-only memory (CD-ROM), erasable programmable read-only memory (EPROM), registers, and/or any other type of optical or electromagnetic volatile or non-volatile device for storing information. Furthermore, database 65 may be a specific location in memory 62, a logical association of locations in memory 62, or any other grouping of memory 62. As a further example, codec 66, mixer 67, DSP 68, and processor 69 may be complex instruction set computers (CISCs), reduced instruction set computers (RISC), application specific integrated circuits (ASICs), or any other type of device for manipulating information.

Additionally, the components of conference bridge 60 may have a variety of arrangements. For example, conference bridge 60 may have a variety of communication interfaces such as communication interface 61. Thus, conference bridge 60 may be able to receive information from and send information to communication network 30 through a variety of devices. As another example, part or all of program 63 may be encoded on processor 69. Moreover, part of memory 62 may be stored in processor 69. In addition, codec 66, mixer 67, and/or DSP 68 may be part of processor 69. Furthermore, DSP 68 could be external to conference bridge 60 in some embodiments. A variety of other arrangements will be readily suggested to those skilled in the art.

FIG. 3 illustrates one embodiment of the data structure of database 65 in conference bridge 60 for a conference call. As illustrated, database 65 is composed of a plurality of columns 100, each row in the columns being associated with a potential conference call participant. Columns 100 are subdivided into identification information columns 101, a current participant column 105, a participant address column 106, and a voice profile information column 108.

Identification information columns 101 include a name column 102, which contains the names of at least some of the possible participants in a conference call, a title column 103, which contains a title associated with each of the names in name column 102, and an organization column 104, which contains the name of the organization associated with each of the names in name column 102. For example, by examining the second row of identification information columns 101, it is observed that Janice B. Ho is the CEO of Coma, Ltd.

Current participant column 105 identifies those possible participants in name column 102 that have been identified as being currently involved in the conference call. For example, by examining the illustrated version of current participant column 105, it may be observed that John A. Smith, James Q. Davis, and Scott Z. Thomas are currently participating in the conference call. Current participant column 105 is useful for limiting the amount of voice profile information that processor 69 will have to search through to try to find a correspondence for the voice characteristics of the received data, because without current participant column 105, processor 69 may be forced to sort through all of the information in voice profile information column 108 in attempting to match the voice characteristics of the data with a set of information in voice profile information columns 108.

The indicators in current participant column 105 are normally set to indicate that the associated participants are not participating in the conference call. Conference bridge 60 may then adjust the indicators upon determining the entrance of participants into a conference call. For example, conference bridge 60 may request or require that a person announce their name upon joining a conference call. This name could be associated with the name of one of the names in name column 102 and the appropriate indicator in current participant column 105 set. For instance, conference bridge 60 may use adaptive speech recognition to convert the spoken name to a textual name and search name column 102 for a match. Additionally, conference bridge 60 may compare the data representing audible sounds during the initial stages of a conference call against the voice profile information in column 108 to determine the participants in the conference call and then set the appropriate indicators in current participant column 105. A variety of other techniques for identifying the current participants in the conference call will be readily suggested to those skilled in the art.

In particular embodiments, the administrator of the conference call may be allowed to override the information for the adaptive speech recognition software to correct any errors. For example, suppose one of the participants is named "Kris Thomson," but the adaptive speech recognition software associates them with the name "Chris Thompson." The administrator would be able to instruct directory server 50 that it has made an erroneous identification and correct the identification. Additionally, the administrator may aid the identification server by specifying the participants in the conference call beforehand, so that the voice profile information and identification information will be available at the beginning of the conference call.

Participant address column 106 includes information regarding the address of the user device that the participant is currently using. Thus, when a packet containing data representing audible sounds is received from an address, processor 69 may have a limited number of participants to search through to find whether corresponding voice profile information exists. The addresses in column 106 may be input prior to the beginning of the conference call or established as each participant begins speaking during the conference call.

Voice profile information column 108 may include any of a variety of voice characteristics. For example, voice profile information column may contain information regarding the frequency characteristics of the associated participant's voice. By comparing the frequency characteristics of the audible sounds represented by the data in the payload of the packets, processor 69 can determine whether any of the voice profile information in voice profile information column 108 corresponds to the data.

Although one embodiment of database 65 is illustrated in FIG. 3, a variety of other embodiments exist. For example, database 65 may store any of a variety of identification information other than or in addition to that shown in identification information columns 101. For instance, the identification information may include the location of the participant, the education of the participant, the experience of the participant, and/or any other relevant identification information. As another example, voice profile information column 108 may include any of a variety of other voice characteristics that can help to identify one of the participants. As a further example, conference bridge 60 may be able to handle several conference calls simultaneously. Thus, this representation of database 65 may be one of many in database 65. As still a further example, the information may have any of a variety of arrangements. A variety of other information for database 65 will be readily suggested to those skilled in the art.

The information in database 65 is typically obtained from directory server 50 prior to or during a conference call. For example, conference bridge 60 may apriori know who the potential participants in a conference call will be. Thus, it may request the information from directory server 50 before the conference call begins. As another example, during the initial stages of a conference call, conference bridge 60 may send extracted voice characteristics to directory server 50 so that directory server 50 may attempt to find corresponding voice profile information and send the corresponding voice profile information and associated identification information to conference bridge 60. As a further example, conference bridge 60 may have participants announce their name upon entering the conference call. Conference bridge 60 may then send a textual representation of the name to directory server 50 so that it may attempt to find corresponding identification information and send the identification information and associated voice profile information to conference bridge 60. Furthermore, when conference bridge 60 is not able to associate extracted voice characteristics with any voice profile information in column 108 during a conference call, it may send the extracted for voice characteristics to directory server 50 so that it may find a correspondence and provide voice profile information and identification information.

FIG. 4 illustrates one embodiment of directory server 50 for communication system 10. In this embodiment, directory server 50 includes a communication interface 51, a memory 52, and a processor 57. Communication interface 51 is adapted to be coupled to one of communication links 32 and is operable to send information to and receive information from communication network 30. Memory 52 is coupled to communication interface 51 and includes a program 53 and a directory database 55. Program 53 includes a set of logic 54 for processor 57, and directory database 55 stores voice profile information and identification information for at least some of the possible participants in conference calls. The information in directory database 55 may be for a specific group of people, such as the employees of a business or a group of people expected to participate in a conference call, or a general group of people, such as a nationwide directory, and may be continually stored in directory database 55 or retrieved from other databases based on the participants participating in or expected to participate in a conference call. The voice profile information may be input into directory database 55 before the conference call begins, but may also be input at the beginning or even during the conference call. Processor 57 is coupled to memory 52 and is operable to disseminate the information in directory database 55 and to determine if messages requesting information have data corresponding to information in directory database 55.

In operation, directory server 50 receives requests from conference bridge 60 before or at the beginning of conference calls to send information regarding specific participants to participate in a conference call. Processor 57 retrieves this information from directory database 55 and sends it to conference bridge 60. During the conference call, directory server 50 may also receive messages containing voice characteristics for unidentified speakers from conference bridge 60. Upon detecting such messages, directory server 50 compares the voice characteristics to the voice profile information stored in directory database 55. If processor 57 determines that an acceptable correspondence between the voice characteristics and one set of voice profile information in directory database 55 exists, then a participant has been associated with the audible sounds. Processor 57 then extracts the voice profile information and the associated identification information and sends it to conference bridge 60.

In some embodiments, processor 57 may have additional functions. For example, at the end of a conference call, processor 57 may update the voice profile information in directory database 55 for the participants in the conference call based on information received from conference bridge 60. As another example, instead of sending the identification information to the conference bridge 60, directory server 50 may send the identification information directly to the user devices 20a–z participating in the conference call. Thus, conference bridge 60 could relay an identifier associated with the voice profile information so that the user devices could display the appropriate information. In particular embodiments, directory server 50 may receive identification information, such as a textural representation of a name, and compare the received information against the identification information in directory database 55 to find corresponding information. A variety of other functions will be readily suggest to those skilled in the art.

The components of directory server 50 may have a variety of forms. For example, communication interface 51 may be a network interface card, a modem, a transceiver, or any other type of device for sending information to and receiving information from communication network 30. As another example, processor 57 may be a CISC, a RISC, or any other type of device for manipulating information. In particular embodiments, processor 57 may be able to perform digital signal processing to extract voice characteristics from data representing audible sounds or may have a dedicated DSP to do such. As a further example, memory 52 may be RAM, CD-ROM, EPROM, registers, and/or any other type of electromagnetic or optical volatile or non-volatile device for storing information. Directory database 55 of memory 52 may be a relational database, a flat database, or any other organizational format of information and may be a defined location in memory 52, a logical association of locations in memory 52, or any other grouping of memory 52. Furthermore, directory database 55 could be part of a specific conference system, such as, for example, a business, or, more powerfully, part of a general directory schema and accessed via an interface such as LDAP.

Additionally, the components of directory server 50 may have a variety of arrangements. For example, directory server 50 may have a variety of communication interfaces like communication interface 51. As another example, some or all of program 53 may be encoded on processor 57. Moreover, portions of memory 52, including program 53, may be stored on processor 57. A variety of other arrangements will be readily suggested to those skilled in the art.

FIG. 5 illustrates one embodiment of user device 20a for communication system 10. In the illustrated embodiment, user device 20a includes a communication interface 21, a memory 22, a processor 25, an output device 26, an output device 27, an input device 28, and an input device 29. Communication interface 21 is adapted to be coupled to one of communication links 32 of communication network 30 and is operable to send information to and receive information from communication network 30. Memory 22 is coupled to communication interface 21 and includes a buffer 23 and a program 24. Buffer 23 stores data representing audible sounds, and any associated identification information, received through communication interface 21, and program 24 contains logical instructions for processor 25. Processor 25 is coupled to memory 22 and operates, at least in part, to generate output based on the received data and identification information. Output device 26 and output device 27 are also coupled to memory 22 and are operable to convert the data representing the audible sounds into a format intelligible to a user of user device 20a and to convert the identification information into a format that is intelligible to a user of user device 20a, respectively. Input device 28 and input device 29 are also coupled to memory 22 and are operable to translate inputs from the user into a format that is understandable by processor 25.

In operation, communication interface 21 receives packets containing data representing audible sounds and messages containing identification information associated with the data, which are stored in buffer 23. Processor 25 periodically or continuously retrieves a packet and an associated message, if any, from buffer 23. In particular embodiments, processor 25 may have to associate the packet and the message based on common identifiers, such as a time stamp. Upon detecting a packet, processor 25 performs any necessary processing on the data, such as, for example, format conversion and/or decoding, and conveys the data to output device 26. Output device interface 26 generates signals, audible, visual, or otherwise, that are intelligible to a user of user device 20a based on the data. Processor 25 also performs any necessary processing on the message, such as, for example, format conversion or protocol conversion, and conveys the identification information to output device 27. Output device 27 generates signals, audible, visual, or otherwise, that are intelligible to a user of user device 20a based on the identification information. The signals may include the name of the identified speaker, the position of the identified speaker, the picture of the identified speaker, and/or any other suitable indicator.

Additionally, user device 20a also sends data representing audible sounds to the other participants of the conference call. In this case, input device 28 detects the audible sounds emitted by the participant and converts them into electrical signals that are understandable by processor 25. Upon detecting signals that represent audible sounds of the associated participant, processor 25 generates packet(s) containing data representing the audible sounds and sends the packets through communication interface 21 to conference bridge 60.

User device 20a may also have additional functionality. In particular embodiments, user device 20a may be able to adjust the audible sounds received from different participants of the conference call such that each participant appears to be speaking from different directions, as described in U.S. Pat. No. 6,011,851. This may be particularly useful where several participants are sitting around a conference table using one user device. The directions may be specified before the conference call begins and/or during the conference call. The identification information associated with the packets helps to facilitate this process by allowing user device 20a to easily identify which participant is associated with which data. In other embodiments, user device 20a may allow the participant to specify which identification information, such as the name, title, and/or organization, that they want user device 20a to provide them with about the participants. Processor 25 can then use this specification to regulate the identification information provided to the participant. A variety of other functions will be readily suggested to those skilled in the art.

The components of user device 20a may have a variety of different forms. Communication interface 21 may be a network interface card, a modem, a transceiver, or any other type of device for sending information to and receiving information from communication network 30. Memory 22 may be RAM, CD-ROM, EPROM, registers and/or any other type of device for storing information. Buffer 23 of memory 22 may be a physical location in memory 22, a logical association of locations in memory 22, or any other grouping of memory 22. Processor 25 may be a RISC, a CISC, or any other type of device for manipulating information. Additionally, processor 25 may include a decoder, a digital signal processor, or any other type of device for converting data representing audible signals into an appropriate format for output device 26. Output device 26 may be a speaker, a liquid crystal display (LCD), a cathode ray tube (CRT) display, or any other type of device for generating output based upon data representing audible sounds. Output device 27 may be an LCD, a CRT display, or any other type of device for generating output based on identification information. Input device 28 and/or input device 29 may be a mouse, a microphone, a keyboard, or any other type of device for receiving input from a user of user device 20a.

Additionally, components of user device 20a may have a variety of arrangements. For example, some or all of program 24 may be encoded on processor 25. As another example, output device 26 may be the same as output device 27, especially when user device 20a is configured for use by the deaf. A variety of other arrangements will be suggested to those skilled in the art.

FIG. 6 is a flowchart 600 illustrating a method for identifying a participant during a conference call in accordance with one embodiment of the present invention. In specific embodiments, this method may be implemented by conference bridge 60 in FIG. 1. At function block 604, the method calls for receiving information, for example, identification information and voice profile information, regarding the participants in a conference call. As discussed previously, this may be accomplished by requesting the information from a database based on the anticipated participants in a conference call before the conference call begins, requesting information from a database based on the initial conversations in the conference call, requesting information from a database based on a textual representation of a spoken name of a person entering the conference call, or by any other appropriate manner. After receiving the information regarding the participants in the conference call, the method calls for waiting to receive data representing audible sounds at decision block 608. Upon receiving data representing audible sounds, the method calls for decoding the data at function block 616 and analyzing the decoded data to determine voice characteristics of the audible sounds at function block 620. The determined voice characteristics are then compared to the voice profile information for one of the participants in the conference call at function block 624.

If the voice profile information for the participant being examined corresponds to the determined voice characteristics of the received data at decision block 628, the method calls for obtaining identification information associated with the corresponding voice profile information at function block 632. The method then calls for generating and sending a message containing the identification information and a time stamp at function block 634 and updating the voice profile information for the participant associated with the audible sounds at function block 636. In particular embodiments, an identifier other than a time stamp may be used so that the message may be associated with the appropriate data representing the audible sounds. At function block 640, the method calls for determining whether the conference call has ended; if it has not, the method determines whether more data representing audible sounds has been received at decision block 608.

If, however, the voice profile information for the participant being examined does not correspond to the determined voice characteristics at decision block 628, the method calls for determining whether all of the participants in the conference call have been examined at decision block 644. If all the participants in the conference call have not been examined, the determined voice characteristics are compared to the voice profile information for another participant of the conference call at function block 624, and a determination is made as to whether there is a correspondence at decision block 628. If, however, all of the participants in the conference call have been examined at decision block 644, then there is no acceptable correspondence between the audible sounds represented by the data and any of the voice profile information in the database. Thus, no participant can be said to correspond to the audible sounds. The method then calls for generating and sending a message containing the determined voice characteristics at function block 646, which may be sent to a directory server such as directory server 50, for example, and generating and sending a message indicating that no identification information is associated with the data and containing a time stamp at function block 648. In particular embodiments, an identifier other than a time stamp may be used so that the message may be associated with the appropriate data representing the audible sounds. The method then calls for determining whether the conference call has ended at decision block 640.

Although flowchart 600 illustrates one method for identifying a participant during a conference call, other embodiments of the present invention may possess none, one, some, or all of these operations and/or additional operations. Additionally, although a particular arrangement of the operations has been shown in flowchart 600, other embodiments of the present invention may have different arrangements of the operations. For example, a method does not have to include determining the participants in the conference call before beginning to analyze the data representing audible sounds. Moreover, the method may call for analyzing the data to determine the participants in the conference call. As another example, a method may call for determining that there are other participants in the conference call as the conference call progresses, by, for example, receiving data regarding the spoken name of a participant or analyzing data that is not associated with one of the participants. As a further example, a method may not call for decoding the data representing audible sounds if the data is able to be compared in its coded format to the voice profile information in the database. As still a further example, a method may call for filtering the voice profile information to be compared against the determined voice characteristics based on the origination address of the data. As still another example, a method may call for sending the data representing the audible sounds to another entity for determination of the voice characteristics. A variety of other operations and arrangements will be readily suggested to those skilled in the art.

FIG. 7 is a flowchart 700 illustrating a method for identifying a participant during a conference call in accordance with one embodiment of the present invention. In particular embodiments, this method may be implemented by directory server 50 in FIG. 1. At function block 702, the method calls for receiving a message requesting information regarding a participant in a conference call. As discussed previously, this may occur in response to specific requests for this participant before the conference call begins, a request to match voice characteristics to the voice profile information in the database during initial conversations in the conference call, a request to associate a name of a person upon their entrance into the conference call with identification information, or by any other appropriate manner. The method then calls for extracting voice profile information and identification information from a database for the participant at function block 704 and generating and sending a message containing the voice profile information and the identification information at function block 708. Note that function blocks 702–706 may be repeated multiple times. Alter sending the information, the method calls for waiting to receive a message containing voice characteristics at decision block 712. After receiving the voice characteristics, the method calls for comparing the received voice characteristics to voice profile information in the database to determine whether there is an appropriate correspondence at decision block 716. If there is an appropriate correspondence, the method calls for generating and sending a message containing the corresponding voice profile information and the associated identification information at function block 720. After this, or if there is no corresponding voice profile information, the method calls for waiting to receive another message at function block 712.

Although flowchart 700 illustrates one method of identifying a participant during a conference call, other embodiments of the present invention may have none, one, some, or all of the operations in flowchart 700 and/or additional operations. Additionally, other embodiments may have a different arrangement of operations. For example, in other embodiments, a method may call for retrieving voice profile information and identification information from other directories if the data in a message does not have corresponding information in the database. As a further example, other methods may call for updating the voice profile information at the end of the conference call. As still a further example, some methods may call for analyzing other types of data to determine whether corresponding information exists in the database. A variety of other operations and arrangements will be readily suggested to those skilled in the art.

Although several embodiments of the present invention have been discussed, numerous additions, deletions, substitutions, and/or alterations to the invention may be readily suggested to one of skill in the art without departing from the scope of the appended claims. It is intended, therefore, that the appended claims encompass such additions, deletions, substitutions, and/or alterations.

What is claimed is:

1. A method for identifying a participant during a conference call, comprising:

receiving a packet containing data that represents audible sounds spoken by one of a plurality of participants in a conference call;

determining a speaker of the audible sounds using frequency characteristics stored in a voice profile of the participants;

providing identification information of the speaker to the other participants in the conference call contemporaneously with providing audible sounds based on the data to those participants; and updating the voice profile information based on the audible sounds if the audible sounds are associated with the voice profile information of one of the participants.

2. The method of claim 1, wherein identification information comprises the name and title of the speaker associated with the voice profile information.

3. The method of claim 1, wherein providing identification information for the speaker to the other participants comprises generating a message containing identification information associated with the voice profile information of the speaker.

4. The method of claim 1, wherein the packet is a voice over Internet protocol packet.

5. The method of claim 1, wherein determining a speaker of the audible sounds using voice profile information for the participants comprises analyzing the data to determine frequency characteristics of the audible sounds and comparing the determined frequency characteristics to frequency characteristics in the voice profile information.

6. The method of claim 1, wherein determining a speaker of the audible sounds using voice profile information for the participants comprises:

receiving voice profile information and identification information regarding the participants to be involved in the conference call; and comparing the data against the voice profile information of the participants to be involved in the conference call.

7. The method of claim 6, wherein the message contains a time stamp that associates it with the data representing the audible sounds.

8. The method of claim 1, wherein providing identification information for the speaker to the other participants comprises generating a message indicating that no participant has been associated with the audible sounds if the audible sounds are not determined to be associated with the voice profile information of the participants.

9. The method of claim 1, wherein providing identification information for the speaker to the other participants contemporaneously with providing audible sounds based on the data comprises displaying the name associated with the voice profile information while generating audible sounds based on the data.

10. The method of claim 1, wherein the data is in G.711, G.723, or G.729 format.

11. The method of claim 1, further comprising adjusting, based on the identity of the speaker, the direction from which the audible sounds based on the data arrive at a participant of the conference call.

12. The method of claim 1, wherein determining a speaker of the audible sounds using voice profile information of the participants comprises using the address from which the data representing the audible sounds originated to reduce the voice profile information to be searched.

13. The method of claim 1, further comprising adjusting the identification information provided to a participant based on commands from the participants.

14. The method of claim 1, further comprising:
   determining that the audible sounds are not associated with the voice profile information of the participants; and
   generating a message requesting identification information and voice profile information associated with the audible sounds.

15. A method for identifying a participant during a conference call, comprising:
   receiving a packet containing data that represents audible sounds spoken by one of a plurality of participants in a conference call;
   determining whether the audible sounds represented by the data are associated with frequency characteristics stored in a voice profile of one of the participants;
   generating a message containing identification information associated with the voice profile information if the audible sounds are associated with the voice profile information of one of the participants; and
   updating the voice profile information based on the audible sounds if the audible sounds are associated with the voice profile in formation of one of the participants.

16. The method of claim 15, further comprising initiating sending the message and the data to a plurality of participants in the conference call.

17. The method of claim 15, wherein the identification information comprises the name and title of the participant and the voice profile information comprises voice frequency characteristics of the participant.

18. The method of claim 15, wherein the packet is a voice over Internet protocol packet.

19. The method of claim 15, wherein determining whether the audible sounds represented by the data are associated with voice profile information of one of the participants comprises analyzing the data to determine frequency characteristics of the audible sounds and comparing the determined frequency characteristics to frequency characteristics in the voice profile information.

20. The method of claim 15, wherein determining whether the audible sounds represented by the data are associated with voice profile information of one of the participants comprises:
   receiving voice profile information and identification information regarding the participants to be involved in a conference call; and
   comparing the data against the voice profile information of the participants to be involved in the conference call.

21. The method of claim 15, wherein generating a message containing identification information associated with the voice profile information comprises generating a message containing the name and title associated with the voice profile information.

22. The method of claim 15, wherein the message includes a time stamp associating the identification information with the data.

23. The method of claim 15, further comprising generating a message indicating that no voice profile information has been associated with the audible sounds if the audible sounds are not associated with the voice profile information of one of the participants.

24. The method of claim 15, wherein determining whether the audible sounds represented by the data are associated with voice profile information of one of the participants comprises using an origination address associated with the data to reduce the voice profile information to be searched.

25. The method of claim 15, further comprising:
   determining that the audible sounds are not associated with the voice profile information of the participants; and
   generating a message requesting identification information and voice profile information associated the audible sounds.

26. The method of claim 15, further comprising:
   determining that a participant wants to enter the conference call; and
   generating a message requesting voice profile information and identification information of the participant.

27. A set of logic encoded in media for identifying a participant during a conference call, the logic operable to:
   detect the reception of a packet containing data that represents audible sounds spoken by one of a plurality of participants in a conference call;
   determine whether the audible sounds represented by the data are associated with frequency characteristics stored in a voice profile of one of the participants;
   generate a message containing identification information associated with the voice profile information if the audible sounds are associated with the voice profile information of one of the participants; and
   update the voice profile information based on the audible sounds if the audible sounds are associated with the voice profile information of one of the participants.

28. The logic of claim 27, wherein the logic is further operable to initiate sending the message and the data to a plurality of participants in the conference call.

29. The logic of claim 27, wherein the identification information comprises the name and title of the participant and the voice profile information comprises voice frequency characteristics of the participant.

30. The logic of claim 27, wherein the packet is a voice over Internet protocol packet.

31. The logic of claim 27, wherein the logic is operable to analyze the data to determine frequency characteristics of the audible sounds and compare the determined frequency characteristics to frequency characteristics in the voice profile information in determining whether the audible sounds represented by the data are associated with voice profile information of one of the participants.

32. The logic of claim 27, wherein determining whether the audible sounds represented by the data are associated with voice profile information of one of the participants comprises:
  receiving voice profile information and identification information regarding the participants to be involved in a conference call; and
  comparing the data against the voice profile information of the participants to be involved in the conference call.

33. The logic of claim 27, wherein the logic is operable to generate a message containing the name and title associated with the voice profile information in generating a message containing identification information associated with the voice profile information.

34. The logic of claim 27, wherein the message includes a time stamp associating the identification information with the data.

35. The logic of claim 27, wherein the logic is further operable to generate a message indicating that no voice profile information has been associated with the audible sounds if the audible sounds are not associated with the voice profile information of one of the participants.

36. The logic of claim 27, wherein the logic is operable to use an origination address associated with the data to reduce the voice profile information to be searched in determining whether the audible sounds represented by the data are associated with voice profile information of one of the participants.

37. The logic of claim 27, wherein the logic is further operable to:
  determine that the audible sounds are not associated with the voice profile information of the participants; and
  generate a message requesting identification information and voice profile information associated with the audible sounds.

38. The logic of claim 27, wherein the logic is further operable to:
  determine that a participant wants to enter the conference call; and
  generate a message requesting voice profile information and identification information of the participant.

39. An apparatus for identifying a participant during a conference call, comprising:
  means for receiving a packet containing data that represents audible sounds spoken by one of a plurality of participants in a conference call;
  means for determining whether the audible sounds represented by the data are associated with frequency characteristics stored in a voice profile of one of the participants;
  means for generating a message containing identification information associated with the voice profile information if the audible sounds are associated with the voice profile information of one of the participants; and
  means for updating the voice profile information based on the audible sounds if the audible sounds are associated with the voice profile information of one of the participants.

40. The apparatus of claim 39, further comprising means for initiating sending the message and the data to a plurality of participants in the conference call.

41. The apparatus of claim 39, wherein the identification information comprises the name and title of the participant and the voice profile information comprises voice frequency characteristics of the participant.

42. The apparatus of claim 39, wherein the packet comprises a voice over Internet protocol packet.

43. The apparatus of claim 39, wherein means for determining whether the audible sounds represented by the data are associated with the voice profile information of one of the participants comprises means for analyzing the data to determine frequency characteristics of the audible sounds and means for comparing the determined frequency characteristics to frequency characteristics in the voice profile information.

44. The apparatus of claim 39, wherein means for determining whether the audible sounds represented by the data are associated with the voice profile information of one of the participants comprises means for receiving voice profile information and identification information regarding the participants to be involved in a conference call and means for comparing the data against the voice profile information of the participants to be involved in the conference call.

45. The apparatus of claim 39, wherein means for generating a message containing identification information associated with the voice profile information comprises means for generating a message containing the name and title associated with the voice profile information.

46. The apparatus of claim 39, wherein the message includes a time stamp associating the identification information with the data.

47. The apparatus of claim 39, further comprising means for generating a message indicating that no voice profile information has been associated with the audible sounds if the audible sounds are not associated with the voice profile information of one of the possible participants.

48. The apparatus of claim 39, wherein means for determining whether the audible sounds represented by the data are associated with voice profile information of one of the participants comprises means for using an origination address associated with the data to reduce the voice profile information to be searched.

49. The apparatus of claim 39, further comprising:
  means for determining that the audible sounds are not associated with the voice profile information of the participants; and
  means for generating a message requesting identification information and voice profile information associated with the audible sounds.

50. The apparatus of claim 39, further comprising:
  means for determining that a participant wants to enter the conference call; and
  means for generating a message requesting voice profile information and identification information of the participant.

51. An apparatus for identifying a participant during a conference call, comprising:
  a communication interface adapted to be coupled to a communication network, the communication interface operable to receive information from and send information to the communication network, the communication interface further operable to receive a packet containing data that represents audible sounds;
  a memory coupled to the communication interface, the memory operable to store a program containing logic and to store a database containing voice profile information and identification information for at least some of the participants in a conference call; and
  a processor coupled to the memory, the processor operable to determine whether the audible sounds represented by the data are associated with frequency characteristics stored in the voice profile information of one of the participants, to generate a message including identification information associated with the identified voice profile information if the audible sounds are associated with the voice profile information of one of the participants, and to update the voice profile information in the database based on the audible sounds if the audible sounds are associated with the voice profile information of one of the participants.

52. The apparatus of claim 51, wherein the communication interface comprises a network interface card.

53. The apparatus of claim 51, wherein the identification information comprises the name, title, and organization of the participants and the voice profile information comprises the voice frequency characteristics of the participants.

54. The apparatus of claim 51, wherein the packet comprises a voice over Internet protocol packet.

55. The apparatus of claim 51, wherein the data in the packet is encoded according to G.711, G.723, or G.729.

56. The apparatus of claim 51, wherein the processor is further operable to initiate sending the message and the data to a plurality of participants in the conference call.

57. The apparatus of claim 51, wherein the processor comprises a decoder for decoding the data in the packet and a digital signal processor for extracting voice characteristics from the decoded data.

58. The apparatus of claim 51, wherein the processor is operable to analyze the data to determine frequency characteristics of the audible sounds and compare them against the voice profile information in determining whether the audible sounds represented by the data are associated with the voice profile information of one of the participants.

59. The apparatus of claim 51, wherein the processor generates a message containing the name and title associated with the voice profile information in generating a message including identification information associated with the voice profile information if the audible sounds are associated with the voice profile information of one of the participants.

60. The apparatus of claim 51, wherein the processor is operable to compare the data against the voice profile information of the participants to be involved in the conference call in determining whether the audible sounds represented by the data are associated with the voice profile information of one of the participants.

61. The apparatus of claim 51, wherein the processor generates a message indicating that no voice profile information has been associated with the audible sounds if the audible sounds are not associated with the voice profile information of one of the participants.

62. The apparatus of claim 51, wherein the message includes a time stamp associating the identification information with the data.

63. The apparatus of claim 51, wherein the processor is operable to use an origination address associated with the data to reduce the voice profile information to be searched in determining whether the audible sounds represented by the data are associated with voice profile information of one of the participants.

64. The apparatus of claim 51, wherein the processor is further operable to:
   determine that the audible sounds are not associated with the voice profile information of the participants; and
   generate a message requesting identification information and voice profile information associated with the audible sounds.

65. The apparatus of claim 51, wherein the processor is further operable to:
   determine that a participant wants to enter the conference call; and
   generate a message requesting voice profile information and identification information of the participant.

66. An apparatus for identifying a participant during a conference call, comprising:
   a communication interface adapted to be coupled to a communication network, the communication interface operable to send information to and receive information from the communication network, the communication interface further operable to receive a packet containing data that represents audible sounds;
   a memory coupled to the communication interface, the memory operable to store a program containing logic and to store a database containing voice profile information and identification information for at least some of the participants in a conference call;
   a codec coupled to the memory, the codec operable to decode the data in the packet;
   a digital signal processor coupled to the memory, the digital signal processor operable to determine voice characteristics of the decoded data; and
   a processor coupled to the memory, the processor operable to:
      determine whether the voice characteristics are associated with the voice profile information of one of the participants,
      generate a message including identification information associated with the identified voice profile information if the audible sounds are associated with the voice profile information for one of the participants,
      generate a message indicating that no voice profile information has been associated with the audible sounds if the audible sounds are not associated with the voice profile information of the participants, and
      update the voice profile information in the database based on the audible sounds if the audible sounds are determined to be associated with the voice profile information for one of the possible participants.

67. A method for identifying a participant during a conference call, comprising:
   storing identification information and voice profile information for at least some of the participants in a conference call, the voice profile information including frequency characteristics of one or more participants;
   detecting the reception of a message containing data that represents voice characteristics;
   determining whether the voice characteristics correspond to the frequency characteristics of the voice profile information;
   generating a message containing the corresponding voice profile information and associated identification information if the voice characteristics correspond to any of the voice profile information;
   receiving a second set of voice profile information associated with a participant; and
   updating the voice profile information of the participant based on the second set of voice profile information.

68. The method of claim 67, further comprising generating a message indicating that no voice profile information corresponds to the voice characteristics if none of the voice profile information corresponds to the voice characteristics.

69. The method of claim 67, further comprising:
  detecting the reception of a message containing data that represents the name of a participant;
  determining whether the name corresponds to any of the identification information; and
  generating a message containing the corresponding identification information and associated voice profile information.

70. The method of claim 69, further comprising:
  determining that no identification information corresponds to the name; and
  generating a request to be sent to a second database regarding the name.

71. The method of claim 69, wherein the data is a textual representation of the name.

72. The method of claim 67, wherein the identification information comprises a name, a title, an organization, and an address for each participant.

73. An apparatus for identifying a participant during a conference call, comprising:
  a communication interface adapted to be coupled to a communication network and operable to send information to and receive information from a communication network, the communication interface operable to receive a message containing data that represents voice characteristics;
  a memory storing identification information and voice profile information for at least some of the participants in a conference call;
  a processor operable to:
    detect the reception of the message;
    determine whether the voice characteristics correspond to frequency characteristics included in the voice profile information;
    generate a message containing the corresponding voice profile information and associated identification information if the voice characteristics correspond to any of the voice profile information;
    detect the reception of a second set of voice profile information associated with a participant; and
    update the voice profile information of the participant based on the second set of voice profile information.

74. The apparatus of claim 73, wherein the processor is further operable to generate a message indicating that no voice profile information corresponds to the voice characteristics if none of the voice profile information corresponds to the voice characteristics.

75. The apparatus of claim 73, wherein the processor is further operable to:
  detect the reception of a message containing data that represents the name of a participant;
  determine whether the name corresponds to any of the identification information; and
  generate a message containing the corresponding identification information and associated voice profile information.

76. The apparatus of claim 75, wherein the processor is further operable to:
  determine that no identification information corresponds to the name; and
  generate a request to be sent to a second database regarding the name.

77. The apparatus of claim 76, wherein the data is a textual representation of the name.

78. The apparatus of claim 73, wherein the identification information comprises a name, a title, an organization, and an address for each participant.

79. The method of claim 15, further comprising adjusting, based on whether the audible sounds are associated with the frequency characteristics, a direction from which the audible sounds arrive at a participant of the conference call.

80. The logic of claim 27, wherein the logic is further operable to adjust, based on whether the audible sounds are associated with the frequency characteristics, a direction from which the audible sounds arrive at a participant of the conference call.

81. The apparatus of claim 39, further comprising means for adjusting, based on whether the audible sounds are associated with the frequency characteristics, a direction from which the audible sounds arrive at a participant of the conference call.

82. The apparatus of claim 51, wherein the processor is further operable to adjust, based on whether the audible sounds are associated with the frequency characteristics, a direction from which the audible sounds arrive at a participant of the conference call.

83. The apparatus of claim 66, wherein the processor is further operable to adjust, if the audible sounds are associated with the voice profile information for one of the participants, a direction from which the audible sounds arrive at a participant of the conference call.

84. The method of claim 67, further comprising adjusting, based on whether the voice characteristics correspond to the frequency characteristics of the voice profile information, a direction from which audible sounds arrive at a participant of the conference call.

85. The apparatus of claim 73, wherein the processor is further operable to adjust, based on whether the voice characteristics correspond to the frequency characteristics, a direction from which audible sounds arrive at a participant of the conference call.

86. A method for identifying a participant during a conference call, comprising:
  receiving a packet containing data that represents audible sounds spoken by one of a plurality of participants in a conference call;
  determining whether the audible sounds represented by the data are associated with frequency characteristics stored in a voice profile of one of the participants;
  generating a message containing identification information associated with the voice profile information if the audible sounds are associated with the voice profile information of one of the participants; and
  generating a message indicating that no voice profile information has been associated with the audible sounds if the audible sounds are not associated with the voice profile information of one of the participants.

87. The method of claim 86, wherein determining whether the audible sounds represented by the data are associated with voice profile information of one of the participants comprises:
  receiving voice profile information and identification information regarding the participants to be involved in a conference call; and
  comparing the data against the voice profile information of the participants to be involved in the conference call.

88. The method of claim 86, wherein determining whether the audible sounds represented by the data are associated with voice profile information of one of the participants comprises using an origination address associated with the data to reduce the voice profile information to be searched.

89. The method of claim 86, further comprising generating a message requesting identification information and voice profile information associated with the audible sounds.

90. The method of claim 86, further comprising:
  determining that a participant wants to enter the conference call; and
  generating a message requesting voice profile information and identification information of the participant, if the audible sounds are not associated with the voice profile information of one of the participants.

91. A set of logic encoded in media for identifying a participant during a conference call, the logic operable to:
  detect the reception of a packet containing data that represents audible sounds spoken by one of a plurality of participants in a conference call;
  determine whether the audible sounds represented by the data are associated with frequency characteristics stored in a voice profile of one of the participants;
  generate a message containing identification information associated with the voice profile information, if the audible sounds are associated with the voice profile information of one of the participants; and
  generate a message indicating that no voice profile information has been associated with the audible sounds, if the audible sounds are not associated with the voice profile information of one of the participants.

92. The logic of claim 91, wherein determining whether the audible sounds represented by the data are associated with voice profile information of one of the participants comprises:
  receiving voice profile information and identification information regarding the participants to be involved in a conference call; and
  comparing the data against the voice profile information of the participants to be involved in the conference call.

93. The logic of claim 91, wherein the logic is operable to use an origination address associated with the data to reduce the voice profile information to be searched in determining whether the audible sounds represented by the data are associated with voice profile information of one of the participants.

94. The logic of claim 91, wherein the logic is further operable to:
  determine that a participant wants to enter the conference call; and
  generate a message requesting voice profile information and identification information of the participant.

95. An apparatus for identifying a participant during a conference call, comprising:
  means for receiving a packet containing data that represents audible sounds spoken by one of a plurality of participants in a conference call;
  means for determining whether the audible sounds represented by the data are associated with frequency characteristics stored in a voice profile of one of the participants; and
  means for generating a message containing identification information associated with the voice profile information if the audible sounds are associated with the voice profile information of one of the participants; and
  means for generating a message indicating that no voice profile information has been associated with the audible sounds if the audible sounds are not associated with the voice profile information of one of the possible participants.

96. An apparatus for identifying a participant during a conference call, comprising:
  a communication interface adapted to be coupled to a communication network, the communication interface operable to receive information from and send information to the communication network, the communication interface further operable to receive a packet containing data that represents audible sounds;
  a memory coupled to the communication interface, the memory operable to store a program containing logic and to store a database containing voice profile information and identification information for at least some of the participants in a conference call; and
  a processor coupled to the memory, the processor operable to determine whether the audible sounds represented by the data are associated with frequency characteristics stored in the voice profile information of one of the participants, to generate a message including identification information associated with the identified voice profile information, if the audible sounds are associated with the voice profile information of one of the participants, and to generate a message indicating that no voice profile information has been associated with the audible sounds, if the audible sounds are not associated with the voice profile information of one of the participants.

97. The apparatus of claim 96, wherein the processor comprises a decoder for decoding the data in the packet and a digital signal processor for extracting voice characteristics from the decoded data.

98. The apparatus of claim 96, wherein the processor is operable to compare the data against the voice profile information of the participants to be involved in the conference call in determining whether the audible sounds represented by the data are associated with the voice profile information of one of the participants.

99. The apparatus of claim 96, wherein the processor is operable to use an origination address associated with the data to reduce the voice profile information to be searched in determining whether the audible sounds represented by the data are associated with voice profile information of one of the participants.

100. The apparatus of claim 96, wherein the processor is further operable to generate a message requesting identification information and voice profile information associated with the audible sounds.

101. A method for identifying a participant during a conference call, comprising:
  storing identification information and voice profile information for at least some of the participants in a conference call, the voice profile information including frequency characteristics of one or more participants;
  detecting the reception of a message containing data that represents voice characteristics;
  determining whether the voice characteristics correspond to the frequency characteristics of the voice profile information;
  generating a message containing the corresponding voice profile information and associated identification information if the voice characteristics correspond to any of the voice profile information;
  detecting the reception of a message containing data that represents the name of a participant;
  determining whether the name corresponds to any of the identification information;
  generating a message containing the corresponding identification information and associated voice profile information, if the name corresponds to any of the identification information;
  generating a request to be sent to a second database regarding the name, if the name corresponds to none of the identification information.

102. The method of claim 101, further comprising generating a message indicating that no voice profile information corresponds to the voice characteristics if none of the voice profile information corresponds to the voice characteristics.

103. The method of claim 101, wherein the data is a textual representation of the name.

104. An apparatus for identifying a participant during a conference call, comprising:
a communication interface adapted to be coupled to a communication network and operable to send information to and receive information from a communication network, the communication interface operable to receive a message containing data that represents voice characteristics;
a memory storing identification information and voice profile information for at least some of the participants in a conference call;
a processor operable to:
detect the reception of the message;
determine whether the voice characteristics correspond to frequency characteristics included in the voice profile information;
generate a message containing the corresponding voice profile information and associated identification information if the voice characteristics correspond to any of the voice profile information;
detect the reception of a message containing data that represents the name of a participant;
determine whether the name corresponds to any of the identification information;
generate a message containing the corresponding identification information and associated voice profile information, if the name corresponds to any of the identification information; and
generate a request to be sent to a second database regarding the name, if the name corresponds to none of the identification information.

105. The apparatus of claim 104, wherein the processor is further operable to generate a message indicating that no voice profile information corresponds to the voice characteristics if none of the voice profile information corresponds to the voice characteristics.

106. The apparatus of claim 104, wherein the data is a textual representation of the name.

107. A method for identifying a participant during a conference call, comprising:
receiving a packet containing data that represents audible sounds spoken by one of a plurality of participants in a conference call;
determining whether the audible sounds represented by the data are associated with frequency characteristics stored in a voice profile of one of the participants;
generating a message containing identification information associated with the voice profile information if the audible sounds are associated with the voice profile information of one of the participants; and
adjusting, based on whether the audible sounds are associated with the frequency characteristics, a direction from which the audible sounds arrive at a participant of the conference call.

108. The method of claim 107, wherein determining whether the audible sounds represented by the data are associated with voice profile information of one of the participants comprises:
receiving voice profile information and identification information regarding the participants to be involved in a conference call; and
comparing the data against the voice profile information of the participants to be involved in the conference call.

109. The method of claim 107, wherein determining whether the audible sounds represented by the data are associated with voice profile information of one of the participants comprises using an origination address associated with the data to reduce the voice profile information to be searched.

110. The method of claim 107, further comprising:
determining that a participant wants to enter the conference call; and
generating a message requesting voice profile information and identification information of the participant.

111. A set of logic encoded in media for identifying a participant during a conference call, the logic operable to:
detect the reception of a packet containing data that represents audible sounds spoken by one of a plurality of participants in a conference call;
determine whether the audible sounds represented by the data are associated with frequency characteristics stored in a voice profile of one of the participants;
generate a message containing identification information associated with the voice profile information if the audible sounds are associated with the voice profile information of one of the participants; and
adjust, based on whether the audible sounds are associated with the frequency characteristics, a direction from which the audible sounds arrive at a participant of the conference call.

112. The logic of claim 111, wherein determining whether the audible sounds represented by the data are associated with voice profile information of one of the participants comprises:
receiving voice profile information and identification information regarding the participants to be involved in a conference call; and
comparing the data against the voice profile information of the participants to be involved in the conference call.

113. The logic of claim 111, wherein the logic is operable to use an origination address associated with the data to reduce the voice profile information to be searched in determining whether the audible sounds represented by the data are associated with voice profile information of one of the participants.

114. The logic of claim 111, wherein the logic is further operable to:
determine that a participant wants to enter the conference call; and
generate a message requesting voice profile information and identification information of the participant.

115. An apparatus for identifying a participant during a conference call, comprising:
means for receiving a packet containing data that represents audible sounds spoken by one of a plurality of participants in a conference call;
means for determining whether the audible sounds represented by the data are associated with frequency characteristics stored in a voice profile of one of the participants; and
means for generating a message containing identification information associated with the voice profile information if the audible sounds are associated with the voice profile information of one of the participants; and
means for adjusting, based on whether the audible sounds are associated with the frequency characteristics, a direction from which the audible sounds arrive at a participant of the conference call.

116. An apparatus for identifying a participant during a conference call, comprising:

a communication interface adapted to be coupled to a communication network, the communication interface operable to receive information from and send information to the communication network, the communication interface further operable to receive a packet containing data that represents audible sounds;

a memory coupled to the communication interface, the memory operable to store a program containing logic and to store a database containing voice profile information and identification information for at least some of the participants in a conference call; and a processor coupled to the memory, the processor operable to determine whether the audible sounds represented by the data are associated with frequency characteristics stored in the voice profile information of one of the participants, to generate a message including identification information associated with the identified voice profile information if the audible sounds are associated with the voice profile information of one of the participants, and to adjust, based on whether the audible sounds are associated with the frequency characteristics, a direction from which the audible sounds arrive at a participant of the conference call.

117. The apparatus of claim 116, wherein the processor is operable to compare the data against the voice profile information of the participants to be involved in the conference call in determining whether the audible sounds represented by the data are associated with the voice profile information of one of the participants.

118. The apparatus of claim 116, wherein the processor is operable to use an origination address associated with the data to reduce the voice profile information to be searched in determining whether the audible sounds represented by the data are associated with voice profile information of one of the participants.

119. The apparatus of claim 116, wherein the processor is further operable to:

determine that a participant wants to enter the conference call; and generate a message requesting voice profile information and identification information of the participant.

120. A method for identifying a participant during a conference call, comprising:

storing identification information and voice profile information for at least some of the participants in a conference call, the voice profile information including frequency characteristics of one or more participants;

detecting the reception of a message containing data that represents voice characteristics;

determining whether the voice characteristics correspond to the frequency characteristics of the voice profile information;

generating a message containing the corresponding voice profile information and associated identification information if the voice characteristics correspond to any of the voice profile information; and adjusting, based on whether the voice characteristics correspond to the frequency characteristics of the voice profile information, a direction from which audible sounds arrive at a participant of the conference call.

121. The method of claim 120, further comprising:

detecting the reception of a message containing data that represents the name of a participant;

determining whether the name corresponds to any of the identification information; and generating a message containing the corresponding identification information and associated voice profile information.

122. The method of claim 120, wherein the data is a textual representation of the name.

123. An apparatus for identifying a participant during a conference call, comprising:

a communication interface adapted to be coupled to a communication network and operable to send information to and receive information from a communication network, the communication interface operable to receive a message containing data that represents voice characteristics;

a memory storing identification information and voice profile information for at least some of the participants in a conference call;

a processor operable to:

detect the reception the message;

determine whether the voice characteristics correspond to frequency characteristics included in the voice profile information;

generate a message containing the corresponding voice profile information and associated identification information if the voice characteristics correspond to any of the voice profile information; and adjust, based on whether the voice characteristics correspond to the frequency characteristics, a direction from which audible sounds arrive at a participant of the conference call.

124. The apparatus of claim 123, wherein the processor is further operable to:

detect the reception of a message containing data that represents the name of a participant;

determine whether the name corresponds to any of the identification information; and generate a message containing the corresponding identification information and associated voice profile information.

125. The apparatus of claim 123, wherein the data is a textual representation of the name.

* * * * *

UNITED STATES PATENT AND TRADEMARK OFFICE
CERTIFICATE OF CORRECTION

| | | |
|---|---|---|
| PATENT NO. | : 6,853,716 B1 | Page 1 of 1 |
| APPLICATION NO. | : 09/836055 | |
| DATED | : February 8, 2005 | |
| INVENTOR(S) | : Shmuel Shaffer et al. | |

It is certified that error appears in the above-identified patent and that said Letters Patent is hereby corrected as shown below:

Column 16, Line 30, Claim 25, after "associated" insert -- with --.
Column 28, Line 33, Claim 123, after "reception" insert -- of --.

Signed and Sealed this

Eighth Day of August, 2006

JON W. DUDAS
*Director of the United States Patent and Trademark Office*